United States Patent
Ching et al.

(10) Patent No.: US 10,915,477 B2
(45) Date of Patent: *Feb. 9, 2021

(54) PROCESSING OF EVENTS FOR ACCELERATORS UTILIZED FOR PARALLEL PROCESSING

(71) Applicant: International Business Machines Corporation, Armonk, NY (US)

(72) Inventors: Chachi Ching, Bedford, MA (US); John A. Flanders, Boylston, MA (US); Michael J. Healy, Concord, MA (US); Kevin J. Twilliger, Southborough, MA (US); Jason A. Viehland, Sudbury, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,748

(22) Filed: Jun. 25, 2019

(65) Prior Publication Data

US 2019/0317910 A1 Oct. 17, 2019

Related U.S. Application Data

(63) Continuation of application No. 14/680,219, filed on Apr. 7, 2015, now Pat. No. 10,387,343.

(51) Int. Cl.
*G06F 13/24* (2006.01)
(52) U.S. Cl.
CPC .................................... *G06F 13/24* (2013.01)
(58) Field of Classification Search
None
See application file for complete search history.

(56) References Cited

U.S. PATENT DOCUMENTS 5,438,663 A 8/1995 Matsumoto et al.
6,647,440 B1 11/2003 Bims et al.
(Continued)

FOREIGN PATENT DOCUMENTS

WO 2012082556 A2 6/2012

OTHER PUBLICATIONS

Scheler et al.; "Parallel, Hardware-Supported Interrupt Handling In An Event-Triggered Real-Time Operating System", ACM Case'09, Proceedings Of The 2009 International Conference On Compilers, Architecture, And Synthesis For Embedded Systems, Oct. 11-16, 2009, pp. 167-174.

(Continued)

*Primary Examiner* — Henry Tsai
*Assistant Examiner* — Christopher A Bartels
(74) *Attorney, Agent, or Firm* — Steven Bouknight; Edell, Shapiro & Finnan, LLC (57) ABSTRACT

According to embodiments of the present invention, machines, systems, methods and computer program products for processing events including efficiently processing interrupt service requests for peripheral devices, such as hardware accelerators, utilized in parallel processing are provided. For each core engine of a peripheral device, the peripheral device detects whether one or more interrupt signals have been generated. Information associated with the one or more interrupt signals are stored in one or more registers of peripheral device memory, for each core engine. The information is aggregated and stored in a vector of registers in the peripheral device memory, and the aggregated information is written to memory associated with a CPU to enable CPU processing of interrupt requests from each core engine of the peripheral device.

18 Claims, 10 Drawing Sheets

(56) References Cited

U.S. PATENT DOCUMENTS

| | | |
|---|---|---|
| 6,748,472 B2 | 6/2004 | Knudsen |
| 7,096,294 B2 | 8/2006 | Kulchytskyy et al. |
| 7,953,906 B2 | 5/2011 | Zytaruk et al. |
| 8,082,418 B2 | 12/2011 | Stillwell, Jr. et al. |
| 8,239,600 B2 | 8/2012 | Yamamoto et al. |
| 8,612,661 B2 | 12/2013 | Shimada |
| 9,406,099 B2 | 8/2016 | McKenzie et al. |
| 9,602,437 B1* | 3/2017 | Bernath ............ H04L 49/901 |
| 10,606,772 B2* | 3/2020 | Chellappan ......... G06F 13/102 |
| 2002/0073324 A1 | 6/2002 | Hsu et al. |
| 2004/0210695 A1 | 10/2004 | Weber et al. |
| 2004/0221077 A1* | 11/2004 | Yen .................. G06F 13/4072 |
| | | 710/100 |
| 2005/0144345 A1* | 6/2005 | Nakano ............. G06F 13/4072 |
| | | 710/100 |
| 2006/0018332 A1 | 1/2006 | Kakani et al. |
| 2006/0251067 A1* | 11/2006 | DeSanti ............ H04L 29/12801 |
| | | 370/389 |
| 2006/0294112 A1 | 12/2006 | Mandato et al. |
| 2007/0008902 A1 | 1/2007 | Yaramada et al. |
| 2008/0155571 A1 | 6/2008 | Kenan et al. |
| 2008/0256271 A1 | 10/2008 | Breed et al. |
| 2008/0316921 A1 | 12/2008 | Matthews et al. |
| 2008/0320254 A1 | 12/2008 | Wingard et al. |
| 2009/0228535 A1 | 9/2009 | Rathi et al. |
| 2011/0119526 A1* | 5/2011 | Blumrich .......... G06F 15/17381 |
| | | 714/16 |
| 2011/0131356 A1* | 6/2011 | Devam ............. G06F 13/426 |
| | | 710/105 |
| 2011/0219208 A1* | 9/2011 | Asaad .................. G06F 15/76 |
| | | 712/12 |
| 2012/0254587 A1 | 10/2012 | Biran et al. |
| 2012/0284446 A1 | 11/2012 | Biran et al. |
| 2012/0317323 A1 | 12/2012 | Koesler et al. |
| 2013/0155083 A1 | 6/2013 | McKenzie et al. |
| 2013/0325998 A1* | 12/2013 | Hormuth ........... G06F 15/17331 |
| | | 709/212 |
| 2014/0047150 A1 | 2/2014 | Marietta et al. |
| 2015/0032996 A1 | 1/2015 | Koeberl et al. |
| 2015/0046674 A1* | 2/2015 | Barry ................. G06F 1/3203 |
| | | 712/7 |
| 2015/0046675 A1* | 2/2015 | Barry ................. G06F 13/28 |
| | | 712/7 |
| 2016/0012003 A1* | 1/2016 | Chawla ............. G06F 13/102 |
| | | 710/308 |
| 2016/0299858 A1 | 10/2016 | Ching et al. |

OTHER PUBLICATIONS

Vo et al.; "A Case For OS-Friendly Hardware Accelerators", University Of California, Berkeley, 40th Annual Workshop At The International Symposium On Computer Architecture (ISCA-40), Jun. 2013, pp. 1-8.

Yamagiwa et al.; "Scenario-Based execution Method For Massively Parallel Accelerators", 12th IEEE International Conference On Trust, Security And Privacy In Computing And Communications, Jul. 16-18, 2013, pp. 1039-1048.

Leyva-del-Foyo et al.; "Real-Time Scheduling Of Interrupt Requests Over Conventional PC Hardware", ENC'06 Seventh Mexican International Conference On, Sep. 2006, pp. 17-36.

List of IBM Patents or Patent Applications Treated As Related, filed Jun. 25, 2019.

* cited by examiner

Signal Definitions:
Irq_rdbk – This is the register that the CPU reads for legcy operation.
Irq_i – this is the input IRQ signal from the logic indicating an interrupt
Irq_pend_sel – this bit is the enable for the interrupt to be latched/saved
Irq_extension – this bit holds the IRQ if an IRQ is being received as a previous IRQ is being cleared
Irq_sticky_bit – this bit is set when the IRQ is received

```
// combine irqs in output register at each engine: Accelerator0
irq_rdbk <= {ctabaddescvcsize_sticky_bit,    // [31]
    compbadlastemit1_sticky_bit,// [30]
    compbadlastemit0_sticky_bit,// [29]
    compbadspecialemit_sticky_bit, // [28]

compbadfieldtype1_sticky_bit,    // [27]
    compbadfieldtype0_sticky_bit,// [26]
    compfifooverrun_sticky_bit,// [25]
    compresourcebig_sticky_bit,// [24]

compdeltazero_sticky_bit,    // [23]
    1'b0, // [22]
    1'b0, // [21]
    1'b0, // [20]

4'b0000, // [19 – 16]
    4'b0000, // [15 – 12]
    4'b0000, // [11 – 8]

1'b0, // [7]
    1'b0, // [6]
    1'b0, // [5]
    badpagelength_irq_sticky_bit,    // [4]

1'b0, // [3]
    1'b0, // [2]
    badvarcharlenght_irq_sticky_bit,    // [1]
    badalignment_irq_sticky_bit};    // [0]
```

FIG.6A

```
// IRQ Bit Latch - Example Bit 5=====================================================
// IRQ Extension Bit (Used to hold the sticky bit active if a new irq arrives while the previous one is being cleared)
if (status_wr_en_ireg_d2 & irq_pend_sel & irq_i)
    irq_extension <= 1'b1;
else if (status_wr_en_ireg_d2 & irq_pend_sel & irq_extension) // IRQ Pending bit is the enable
    irq_extension <= 1'b1;
else
    irq_extension <= 1'b0;

// IRQ Sticky Bit
if (irq_i)
    irq_sticky_bit <= 1'b1;
else if (irq_extension)
    irq_sticky_bit <= 1'b1;
else if (status_wr_en_ireg_d2 & irq_pend_sel & wb_pci_rx_data_ireg_d2[5]) // write a '1' to clear the register
    irq_sticky_bit <= 1'b0;
else
    irq_sticky_bit <= irq_sticky_bit;
```

FIG.6B

PROCESSING OF EVENTS FOR ACCELERATORS UTILIZED FOR PARALLEL PROCESSING

BACKGROUND

1. Technical Field

Present invention embodiments relate to processing service requests, and more specifically, to processing interrupt service requests (ISRs) for hardware accelerators utilized in parallel processing in an efficient manner.

2. Discussion of the Related Art

Hardware accelerators, e.g., Field Programmable Gate Arrays (FPGAs), Application Specific Integrated Circuits (ASICs), etc., may be utilized in computing systems to offload work performed by a Central Processing Unit (CPU) to improve computing performance. Accelerators may communicate with the CPU via an interface (e.g., a Peripheral Component Interconnect Express (PCIe) bus, PCI bus, other high-speed bus interface, etc.). Typically, interrupts are used to communicate the status of processing events between the hardware accelerator and CPU. Memory Mapped Input Output (MMIO) requests, which may be used to read registers across a bus, may be utilized to read interrupt requests stored at a physical memory location on the accelerator.

Software-based processes for managing interrupt requests typically involve an interrupt request being sent from a processing core of the hardware accelerator to the CPU. The interrupt request is acknowledged, and registers of the hardware accelerator corresponding to the interrupt are read by the CPU. The CPU also writes to the registers to clear interrupt requests that have been received. Such processes may involve multiple communications between the CPU and the hardware accelerator.

As the number of processing cores (engines) in accelerators has increased from 1 or 2 cores to 4, 8, 16 or more cores, managing interrupt signals has become more complicated and time consuming. For example, each core is associated with a set of interrupt signals, and one or more MMIO requests may be needed to read each set of interrupt signals from a single processing core. In some cases, a first register corresponding to an interrupt is read in order to determine which other registers pertaining to the interrupt need to be read, thus resulting in multiple MMIO read requests over the bus. MMIO requests are slow in operation, and as the number of cores increase, the number of MMIO requests also increase, which adversely impacts system performance. For example, while interrupts are being processed, accelerator cores are not performing work, and thus, acceleration capabilities of the hardware accelerator are underutilized.

SUMMARY

According to embodiments of the present invention, machines, systems, methods and computer program products for efficiently processing interrupt service requests are provided. For each core engine of a peripheral device, the peripheral device detects whether one or more interrupt signals have been generated. Information associated with the one or more interrupt signals is stored in one or more registers of peripheral device memory, for each core engine. The information is aggregated and stored in a vector of registers in the peripheral device memory, and the aggregated information is written to memory associated with a CPU to enable CPU processing of interrupt requests from each core engine of the peripheral device.

These and other aspects, features and embodiments of the present invention will be understood with reference to the drawing figures and the detailed description herein, and may be realized by way of the various elements and combinations particularly pointed out in the appended claims. It is to be understood that both the foregoing general description and the following brief description of the drawings and detailed description are examples and explanatory of preferred embodiments of the invention, and are not restrictive of present invention embodiments.

BRIEF DESCRIPTION OF THE DRAWINGS

Generally, like reference numerals in the various figures are utilized to designate like components.

DETAILED DESCRIPTION

Present invention embodiments allow for portions of software-based components of the Interrupt Service Routine (ISR), typically handled by the CPU in conjunction with a hardware accelerator driver, to be implemented in the hardware of the hardware accelerator, and to allow the hardware to manage its own interrupts. The hardware accelerator comprises circuitry enabling it to write interrupt request information directly to main memory, e.g., Random Access Memory (RAM), associated with the CPU. In some embodiments, the interrupt request information may be aggregated to include interrupt request information from each core engine. In other embodiments, the interrupt request information may be aggregated to include interrupt request information from each core engine along with interrupt request information associated with higher levels or the top level (e.g., system level interrupt requests) of the hardware accelerator. Accordingly, interrupt request information for the entire hardware accelerator may be written to main memory, enabling the CPU to quickly assess the status of the entire hardware accelerator.

Interrupt request information may comprise information identifying the core engine from which the interrupt request was generated and details of the interrupt request itself such as which particular operation caused an interrupt to be generated (e.g., an error signal, a completion signal, etc.).

The CPU of the host machine may access the interrupt request information for the core engines stored in main memory much faster than reading the information from a series of interrupt addresses on the hardware accelerator, using a series of MMIO requests between the CPU and the hardware accelerator over a PCIe bus or equivalent. In some embodiments of the present invention, a single MMIO request may be utilized to acknowledge receipt of the aggregate interrupt request information provided to the CPU by the hardware accelerator. For example, once the aggregate interrupt request information has been written to main memory, the hardware accelerator may send a communication to the CPU, indicating that interrupt request information is available. In response, the CPU may send a single acknowledgement, and may begin processing the aggregated interrupt request information (e.g., for the entire state of the hardware accelerator).

Depending upon the contents of the interrupt request information, the system may not take any further action, may queue up data to be processed, proceed with processing data, or may resolve an error generated from a particular core engine of the hardware accelerator.

Figure 1A:
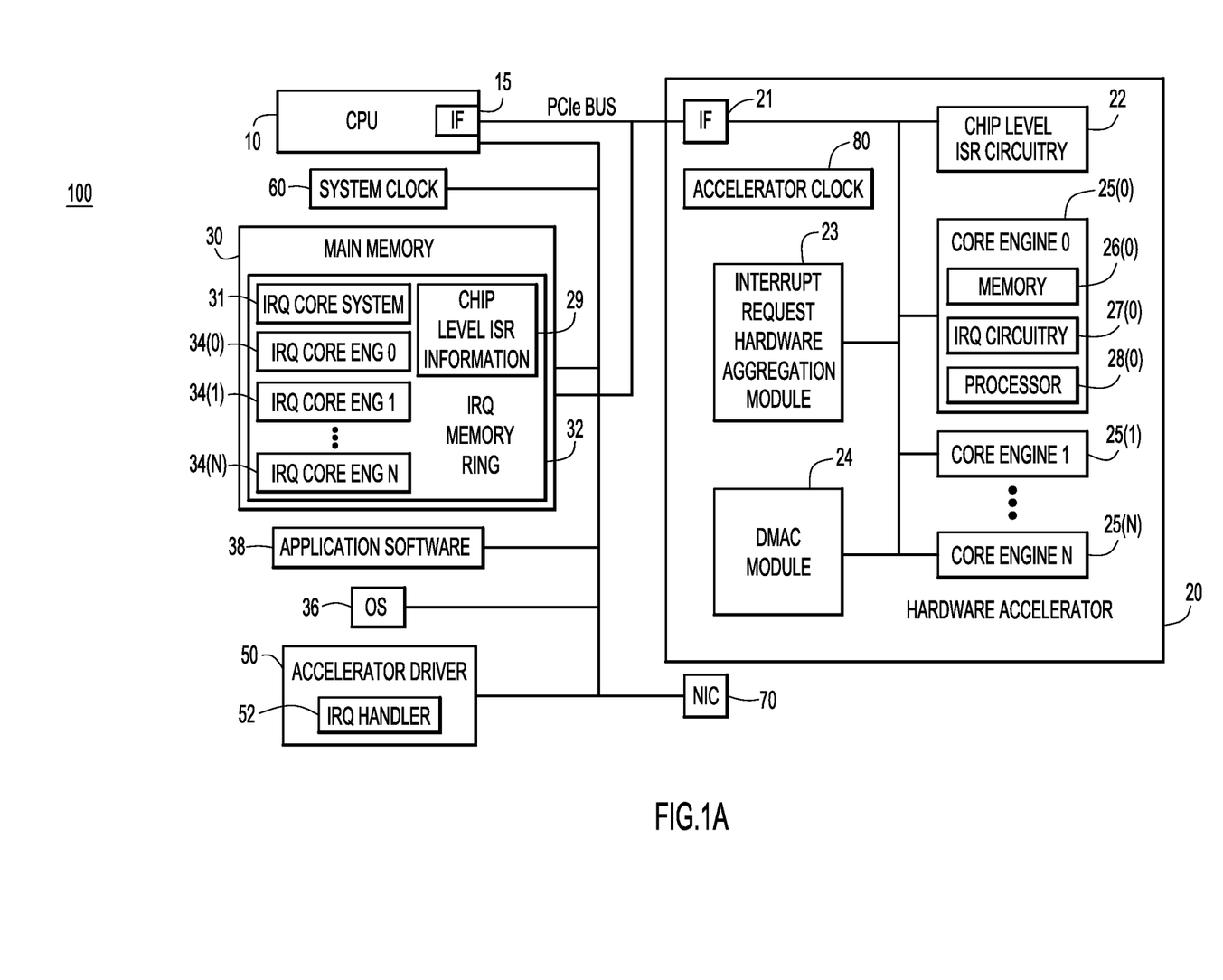
FIG. 1A is an illustration showing an example system for efficiently processing ISRs in accordance with an embodiment of the present invention.

An example environment for use with present invention embodiments is illustrated in FIG. 1A. Specifically, the environment includes host machine 100 comprising CPU 10, hardware accelerator 20, main memory 30, which may comprise Random Access Memory (RAM), and accelerator driver 50.

CPU 10 communicates with hardware accelerator 20 via a bus interface 15 (e.g., a PCIe bus interface or equivalent). Hardware accelerator 20 communicates with CPU 10 via a bus interface 21 (e.g., a PCIe bus interface or equivalent). Hardware accelerator 20 may comprise Interrupt Request Hardware Aggregation Module 23, Chip Level ISR Circuitry 22, Direct Memory Access Controller (DMAC) Module 24, an accelerator clock 80, and a series of core engines 25(0)-25(N) of a multicore hardware accelerator. Each core engine may comprise memory 26 for storing data, interrupt request (IRQ) circuitry 27 for generating and storing information associated with interrupt requests, and processor 28 for processing data.

Host machine 100 may also comprise system clock 60, application software 38, network interface card (NIC) 70, main memory 30 (e.g., RAM), accelerator driver 50, and operating system (OS) 36.

Present invention embodiments implement part of a software-based ISR, typically handled by an accelerator driver 50 and an interrupt request handler 52, in hardware using a hardware accelerator. The hardware of the hardware accelerator aggregates interrupt request information and writes this information directly to a ring of main memory within the CPU's memory space, e.g., IRQ Memory Ring 32. The hardware accelerator manages its own interrupt logic to clear interrupts once interrupt information is written to IRQ memory ring 32. In some embodiments, DMAC module 24 triggers clearing of pending IRQ logic, e.g., within IRQ Circuitry 27(0)-27(N) and within Interrupt Request Hardware Aggregation Module 23, on the same clock as the write to CPU-associated memory, after which additional interrupts may accumulate. Any new interrupts arriving on the same clock as the clear signal will be saved for the next cycle of interrupt request processing.

In general, an ISR is a service routine to manage a hardware initiated signal. When an ISR is triggered, the CPU temporarily suspends current operations and may service the ISR by branching to a service routine, e.g., a subroutine, designed to respond to the event associated with the interrupt signal. ISRs may be triggered when a peripheral device, such as a hardware accelerator or other peripheral device, sends a signal to the CPU, causing an interrupt input pin of the CPU to change status, e.g., change states from a low signal to a high signal, or from a high signal to a low signal. Once the interrupt has been appropriately handled, the CPU may resume normal operations.

The accelerator driver 50 for the accelerator (e.g., hardware accelerator 20, any other PCI-based device or equivalent) may contain an IRQ handler 52 to respond to interrupt requests and take appropriate action, e.g., triggering a subroutine. By assigning work queues to a hardware accelerator and responding to interrupts from the accelerator indicating that the work is complete, parallel processing may be attained.

Main memory 30 may comprise IRQ Memory Ring 32, which is a series of interrupt addresses set up in main memory 30. IRQ Memory Ring 32 may comprise ISR information (see, e.g., Table 2), for each core engine 25(0)-25(N) of hardware accelerator 20, stored in IRQ Core Eng 0 34(0)-IRQ Core Eng N 34(N). IRQ Memory Ring 32 may also comprise Chip Level ISR Information 29, which includes IRQs associated with higher levels or the top level of the hardware accelerator (see, e.g., Table 1). IRQ Core System 31 comprises description of the data structures for ISR information in memory as described below (e.g., Tables 1 and 2).

Buffer descriptors may be utilized to help control parallel processing of data. For example, a buffer descriptor may be a First In First Out (FIFO) memory register, comprising address pointers to instructions and data, e.g., indicating where in other memory pages to deposit processed data, to access unprocessed data, and to access instructions for processing data. Using a buffer descriptor ring, multiple buffer descriptors may be queued up for processing, and processed in the order specified in the Buffer Descriptor Ring, as long as the Buffer Descriptor Ring has data. At the end of each buffer descriptor, an IRQ may indicate through ISRs whether additional data is available for processing, and if so, the next set of data is processed. ISRs may be utilized in parallel processes, in which it is desirable that data flows through each pipeline in an efficient manner. In some embodiments, buffer descriptors may be located in memory of hardware accelerator 20.

A module may include one or more modules or units to perform the various functions of present invention embodiments described throughout this application. Software based modules, e.g., Accelerator Driver 50, OS 36, Application Software 38, etc., may be implemented by any combination of any quantity of software modules or units, and in the case of software components, may reside within non-volatile memory for execution by the CPU. Hardware based modules, e.g., Interrupt Request Hardware Aggregation Module 23, Chip Level ISR Circuitry 22, Core Engine IRQ circuitry 27, etc., may be implemented by any combination of any quantity of hardware modules or units, and may reside within hardware modules in memory of the hardware accelerator.

Figure 1B:
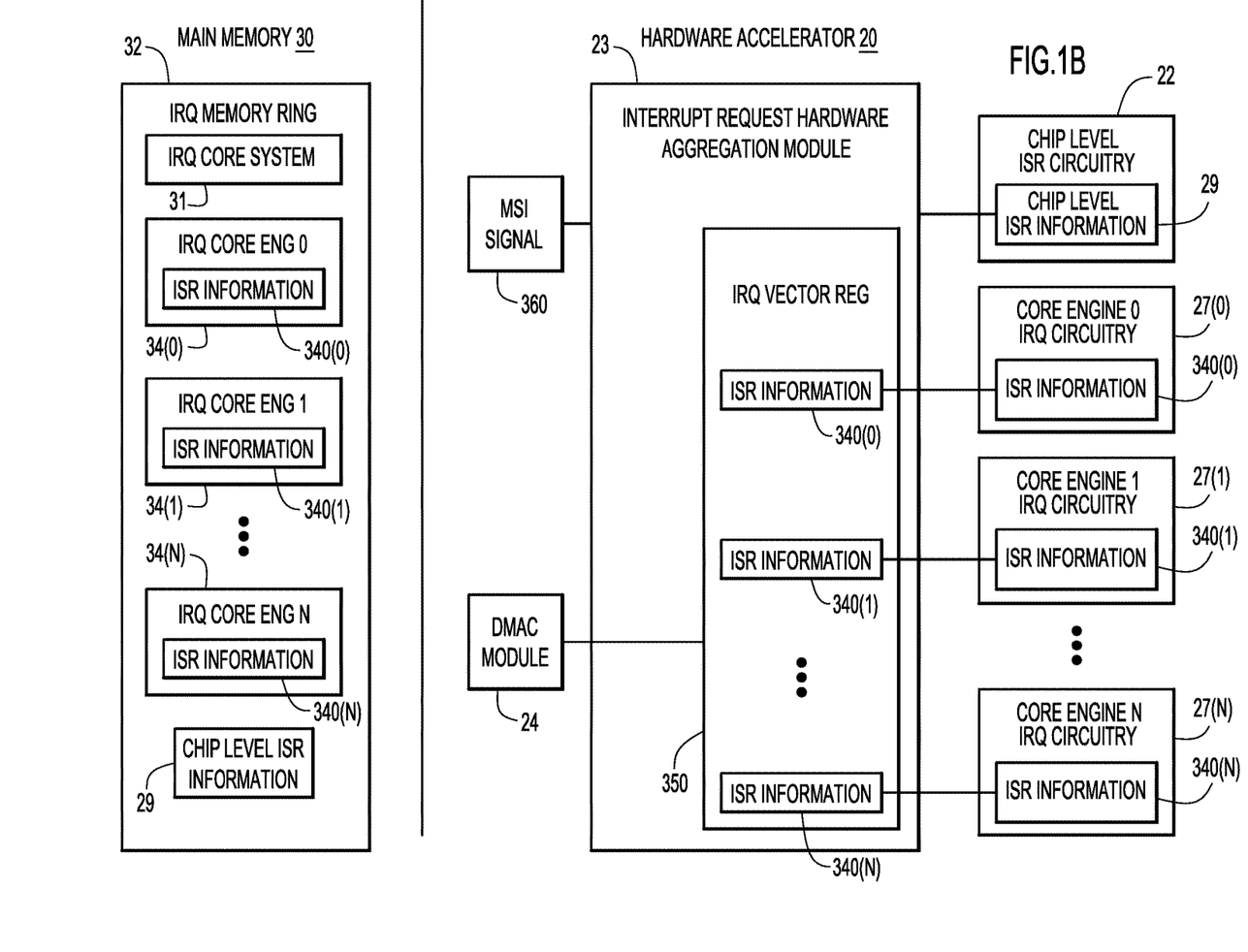
FIG. 1B is another illustration showing in additional detail, aspects of FIG. 1A corresponding to a hardware implementation of portions of an ISR in accordance with an embodiment of the present invention.

FIG. 1B shows an example of ISR hardware aspects of FIG. 1A in additional detail. In particular, FIG. 1B shows hardware elements associated with managing and aggregating interrupt requests using the hardware of the hardware accelerator, as well as aspects of writing aggregated interrupt request information to memory accessible by CPU 10.

Each core engine, core engine 0 25(0)-core engine N 25(N) comprises IRQ Circuitry 27(0)-27(N) having information associated with an interrupt request that is stored in memory local to each core engine. In some embodiments, interrupt request information 340 may comprise a series of bits, each bit corresponding to an error flag associated with a particular type of interrupt, e.g., successful completion of computation, unsuccessful completion of computation due to lack of memory, etc. If multiple bits have been set, with each bit corresponding to a different error flag, the interrupt request information associated with each type of error may be aggregated and written to main memory. In other embodiments, error flag information may be stored in a tree type structure (an error tree), and the top level of the error tree, e.g., a single bit indicating whether any error flags have been set within the error tree, may be aggregated for each core engine and written to main memory. Bits may be stored in latches, to remain in a given state, e.g., logic "high", until receiving an acknowledgement that the interrupt information has been received by the CPU. Each accelerator possesses an independent IRQ circuit 27 with which to notify the CPU of a pending action.

In an example embodiment, IRQ memory ring 32 contains one 256-bit entry for Chip Level ISR information 29, which corresponds to hardware accelerator system 20 at the top level, and one 256-bit entry for each core engine, Core Eng 0-Core Eng N, where N is the total number of core engines in the system. The 256-bit structure may be divided into 8 sections, as shown in the example data structures provided herein, with regard to Table 1 and Table 2. Each category of error includes: Info0, Info1, Sys0 (System 0), Sys1 (System 1), Accelerator0, Accelerator1, HW0 (Hardware 0), HW1 (Hardware 1), and has 32 possible signals for a total of 256-bits. Info0 and Info1 entries indicate no fault. In Table 1, examples of entries that may be found in Sys0 and Sys1 include entries to manage system reprogramming, e.g., busy or system reprogramming done entries, memory fault entries, Built In Self Test (BIST) complete entries, etc. Accelerator0 and Accelerator1 entries indicate errors detected by the accelerator logic during processing. HW0 and HW1 indicate detected hardware faults. The remaining bits of the 256-bit entry are allotted for system-level interrupts. Table 2 is for individual accelerator notifications. Info0, Info1 are purely informational interrupts indicating no fault found in the accelerator at the end of operations. Sys0 and Sys1 indicate system-related faults detected in the accelerator during operation. Accelerator0 and Accelerator1 fields indicate specific filtering faults detected during operation. HW0 and HW1 fields indicate specific hardware faults detected during operations.

For the core engine interrupt blocks, Core Eng 0-Core Eng N, each 256-bit entry corresponds to interrupt signals from the corresponding engine, and also consists of 8 entries of 32-bits each. Each bit corresponds to an IRQ signal, e.g., a buffer descriptor FIFO full, a buffer descriptor FIFO empty, etc.

In some embodiments, accelerator driver 50 parses the data structure of Table 1, first reading the top level entry for the accelerator, and then vectoring to any set accelerator entries corresponding to each core engine.

An example data structure for Chip Level ISR Information 29 is shown in Table 1:

TABLE 1

| Bit | Info0 | Info1 | Sys | Sys1 |
|---|---|---|---|---|
| 31 | RESULT_ABORTED (driver) | | BIST Done | DMA Error |
| 30 | RESULT_ABORTED (FPGA) | | BIST Error | Descriptor Error |
| 29 | | | | |
| 28 | | | | |
| 27:3 2 | | | | |
| 1 | | | | DMA FIFO Full |
| 0 | | | I2C Done | DMA FIFO Empty |

| | Accelerator0 | Accelerator1 | HW0 | HW1 |
|---|---|---|---|---|
| 31 | | | Chip Error-Single Bit | PCIe |
| 30 | | | Chip Error-Multi Bit | |
| 29 | | | Watchdog Timer Timeout | |
| 28 | | | | |
| 27 | | | | |
| 26 | | | | |
| 25 | | | | |
| 24 | | | | |
| 23 | | | | |
| 22:17 | | | | |
| 16 | | | | |
| 15:7 | | | | |
| 6 | | | | |
| 5 | Etc. | | | |
| 4 | Engine 4 | | | |
| 3 | | | | |
| 2 | ... | | | |
| 1 | Engine 1 | | | |
| 0 | Engine 0 | | | |

An example data structure for each accelerator core engine is shown in Table 2:

TABLE 2

| Bit | Info0 | Info1 | Sys0 | Sys1 |
|---|---|---|---|---|
| 31 | RESULT_ABORTED (driver) | | RESULT_BAD MAGICNUMBER | |
| 30 | RESULT_ABORTED (FPGA) | | RESULT_BAD HEADERONLY | |
| 29 | | | RESULT_BAD LAYOUTID | |
| 28 | | | RESULT_BAD TABLED | |
| 27:3 2 | RESULT_ROW OVERFLOW | | | |
| 1 | RESULT_INVALID | | | |
| 0 | RESULT_OVERRUN | | | |

| | Accelerator0 | Accelerator1 | HW0 | HW1 |
|---|---|---|---|---|
| 31 | RESULT _CTA BADDESCVCSIZE | | RESULT_DISKRD FIFOUNDERFLOW | PCIe |
| 30 | RESULT_COMP BADLASTEMIT1 | | RESULT_DISKRD FIFOOVERFLOW | |
| 29 | RESULT_COMPBAD LASTEMIT0 | | RESULT PARSE FIFOUNDERFLOW | |

TABLE 2-continued

| | | |
|---|---|---|
| 28 | RESULT_COMPBAD SPECIALEMIT | RESULT_PARSE FIFOOVERFLOW |
| 27 | RESULT_COMP BADFIELDTYPE1 | RESULT_SQL FIFOUNDERFLOW |
| 26 | RESULT_COMP BADFIELDTYPE0 | RESULT_SQL FIFOOVERFLOW |
| 25 | RESULT_COMP FIFOOVERRUN | RESULT_INSTR FIFOUNDERFLOW |
| 24 | RESULT_COMP RESOURCEBIG | RESULT_INSTR FIFOOVERFLOW |
| 23 | RESULT_COMP DELTAZERO | |
| 22:17 | | |
| 16 | | RESULT_BAD CRC |
| 15:7 | | |
| 6 | | RESULT_SUB MEMPARITY |
| 5 | | RESULT_ DSRMEMPARITY |
| 4 | RESULT_BAD PAGELENGTH | RESULT_RESTRICT FFPARITY |
| 3 | | RESULT_INSTRFF PARITY |
| 2 | | RESULT_PRSFF PARITY |
| 1 | RESULT_BAD VARCHARLENGTH | RESULT_SQLFF PARITY |
| 0 | RESULT_BAD PROJECTALIGN-MENT | RESULT_DRDFF PARITY |

Interrupt Request Hardware Aggregation Module 23 may comprise a series of registers, e.g., a vector of registers used to aggregate ISR information associated with the interrupt signals of each core engine. In this example, IRQ Vector Reg 350 comprises ISR information 340 associated with each core engine. In some embodiments, the information in IRQ Vector Reg 350 is written to IRQ Memory Ring 32 via DMAC Module 24. FIG. 1B shows DMAC Module 24 receiving the aggregate ISR data generated by IRQ circuitry to send to main memory. In other embodiments, system or chip level ISR information 29, from Chip Level ISR Circuitry 22, may be aggregated with the information in IRQ Vector Reg 350, and written to main memory 32 via DMAC module 24. In still other embodiments, a chip level message-signaled interrupt (MSI) signal 360, is generated based upon Chip Level ISR Information 29 and/or ISR Information 340(0)-340(N). When the CPU receives chip-level MSI signal 360, it sends an acknowledgement, then services the ISR by first reading the aggregation register (associated with information indicated by Table 1), and then vectoring to each pending accelerator (associated with information indicated by Table 2) to read its pending interrupts.

IRQ Memory Ring 32 shows a series of addresses in memory, IRQ Core Eng 34(0)-34(N), corresponding to information stored in hardware accelerator 20. In some embodiments, DMAC Module 24 may directly write, for each core engine, information associated with interrupts to IRQ Memory Ring 32. CPU 10 may then determine interrupt status in an efficient manner, as the information is stored in memory local to the CPU.

In other embodiments, the hardware accelerator 20 may write to another interrupt ring in the CPU's memory, which the CPU may then poll upon receiving an IRQ. The accelerator 20 automatically clears its corresponding interrupt once the payload is sent to CPU memory. Once the pending IRQs are cleared, additional work by a separate driver thread may be assigned to the accelerator, while IRQ data is managed.

Figure 2:
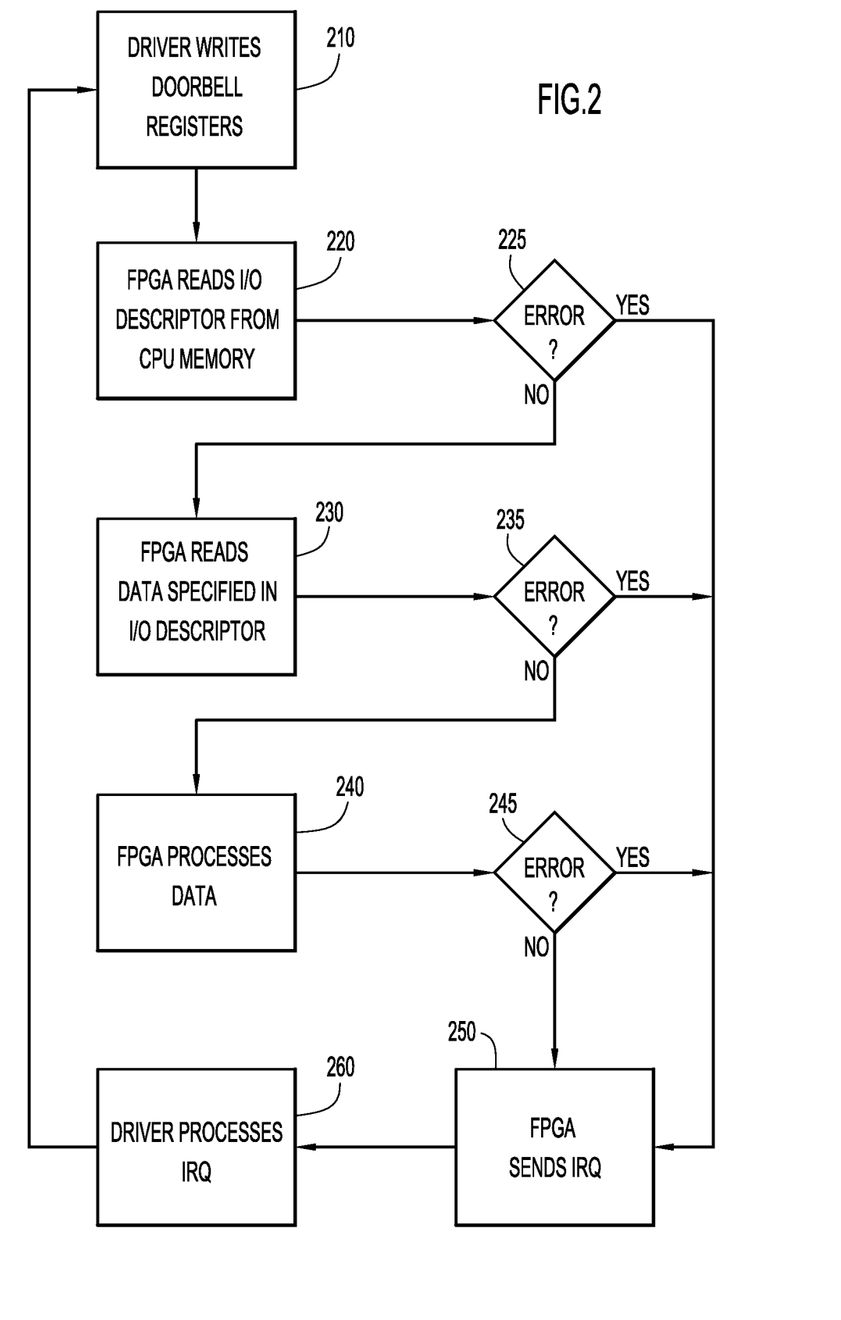
FIG. 2 is a procedural flowchart showing example operations of processing data by an accelerator designated by the CPU as part of a parallel processing workflow in accordance with an embodiment of the present invention.

FIG. 2 shows an example flow chart for communication between CPU 10, main memory 30 and hardware accelerator 20, beginning upstream of interrupt generation. At operation 210, accelerator driver 50 writes to "doorbell" registers on hardware accelerator 20, indicating to the hardware accelerator that data is available for processing. At operation 220, the hardware accelerator 20, which may be an FPGA, reads I/O descriptors from main memory 30 and loads the descriptors into local memory on the hardware accelerator. The descriptors may comprise pointers into main memory indicating addresses of where data is located, instructions for processing data, and where to store processed data. At operation 230, the hardware accelerator reads data specified in the I/O descriptor, and at operation 240 begins processing the data.

At operation 240, once the hardware accelerator 20 successfully finishes processing data, at operation 250, the accelerator sends an interrupt request to the CPU, indicating that processing has successfully completed. At operation 260, driver 50 processes the interrupt request, and the process repeats at operation 210. Processing results are written to an address in main memory specified in the output buffer descriptor. In some embodiments, once work is completed, or upon receiving appropriate signals from the accelerator, a bit is set in the IRQ register file and is marked as pending.

If an error occurs at any of operations 220, 230, or 240, an interrupt request (IRQ) signal corresponding to the error is generated, e.g., at operations 225, 235 or 245, and the hardware accelerator 20 will report the error at operation 250 to the accelerator driver 50. The accelerator driver, at operation 260, will process the IRQ signal, e.g., triggering an appropriate subroutine to resolve the error.

Figure 3:
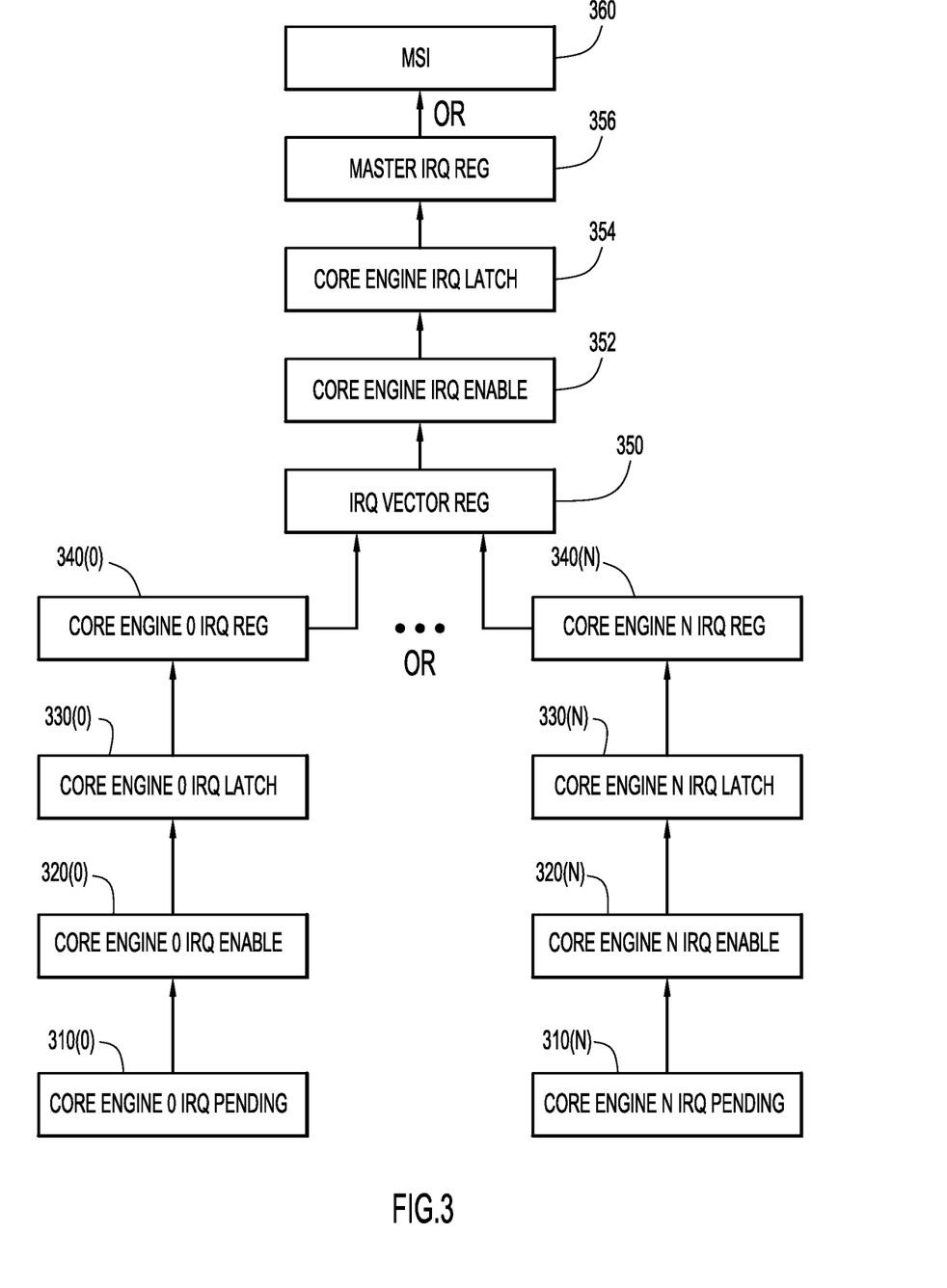
FIG. 3 is a procedural flowchart showing example operations of aggregating interrupt requests for a multicore hardware accelerator in accordance with an embodiment of the present invention.

FIG. 3 shows a flow chart for setting various hardware components within the hardware accelerator 20 in regards to receiving an interrupt signal for each core engine 0 25(0)-core engine N 25(N). Blocks 310 and 320 show, for each core engine 0 25(0)-core engine N 25(N), that an IRQ pending signal and an IRQ enable signal is received. In some embodiments, the IRQ pending signal and the IRQ enable signal may be supplied as input into an 'AND' gate, such that an IRQ will be asserted, e.g., as input into the IRQ latch 330, only when both signals are logical '1'. The interrupt signals for each core engine are aggregated in IRQ vector register 350, to indicate a status for each core engine of the accelerator. This may be accomplished by applying a logical OR operation to the IRQ signals for interrupts of a corresponding core engine to indicate core engines enabling at least one interrupt. The IRQ vector register may serve as a pending register for the core engines, where the core engines are asserted in master IRQ register 356 based on core engine enable and latch signals at 352 and 354. The master IRQ register may drive MSI signal 360 based on at least one core engine asserting an interrupt (e.g., a logical OR operation may be applied to OR the bits of the master IRQ register together to indicate at least one core engine asserting an interrupt). In some embodiments, master IRQ register 356 comprises the IRQ state for the entire hardware accelerator. In other embodiments, the master IRQ register 356 and IRQ vector register may be included in a packet that is written to main memory 30.

It is understood that interrupts may include various types of configurations, e.g., interrupts may be edge sensitive, level sensitive, etc. Edge level interrupts may be acknowledged by a CPU upon a falling edge or rising edge of an input signal; such interrupts are typically latched internally inside the CPU to ensure that the CPU detects the signal and responds to the interrupt request. In other embodiments, level sensitive interrupts that do not require latching may be utilized. The examples provided herein are not intended to be limiting with respect to the particular types of interrupt configurations employed.

Figure 4A:
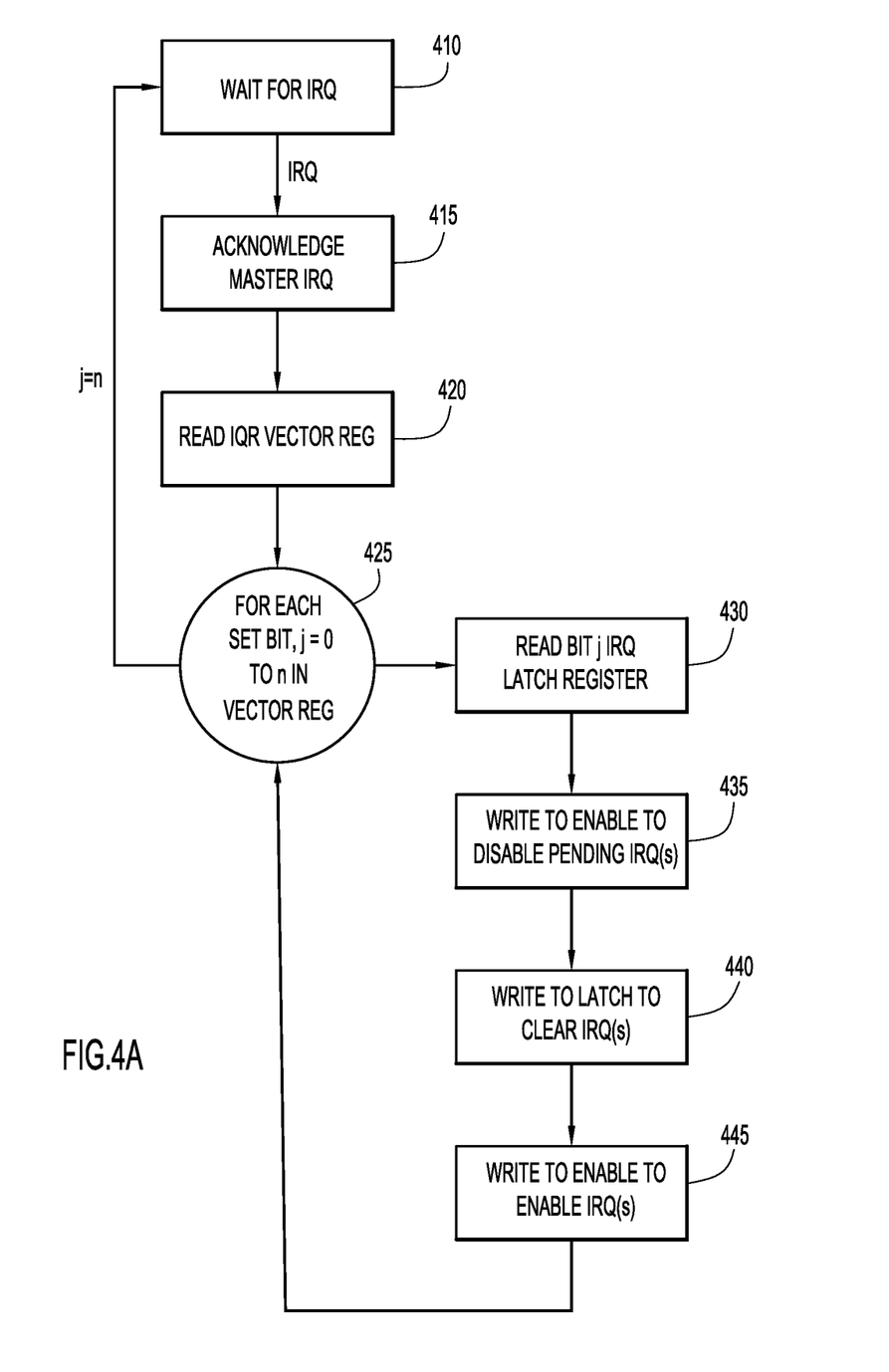
FIG. 4A is a procedural flowchart showing legacy CPU operations for handling ISRs.

FIG. 4A corresponds to legacy operations by the CPU 10 in regards to receiving interrupts from the accelerator 20, e.g., FPGA, etc. At operation 410, the CPU waits for an IRQ signal. Once an IRQ signal is received, the CPU sends an acknowledgement, e.g., acknowledging receipt of a master IRQ signal at operation 415. At operation 420, the CPU reads the information stored in an IRQ Vector Reg. For each bit that is set, as shown at operation 425, with reference to positions j=0 to n in the IRQ Vector Reg, operations 430-445 are repeated.

At operation 430, bit j in an IRQ latch register is read. At operation 435, an enable is written to in order to disable pending IRQs. At operation 440, another write to latch is performed to clear IRQs. The interrupt is cleared by writing the bit of the interrupt back to the register, which clears the latched interrupt. At operation 445, enable is written to in order to enable IRQs, thus enabling the interrupt before additional work is given to the accelerator.

Figure 4B:
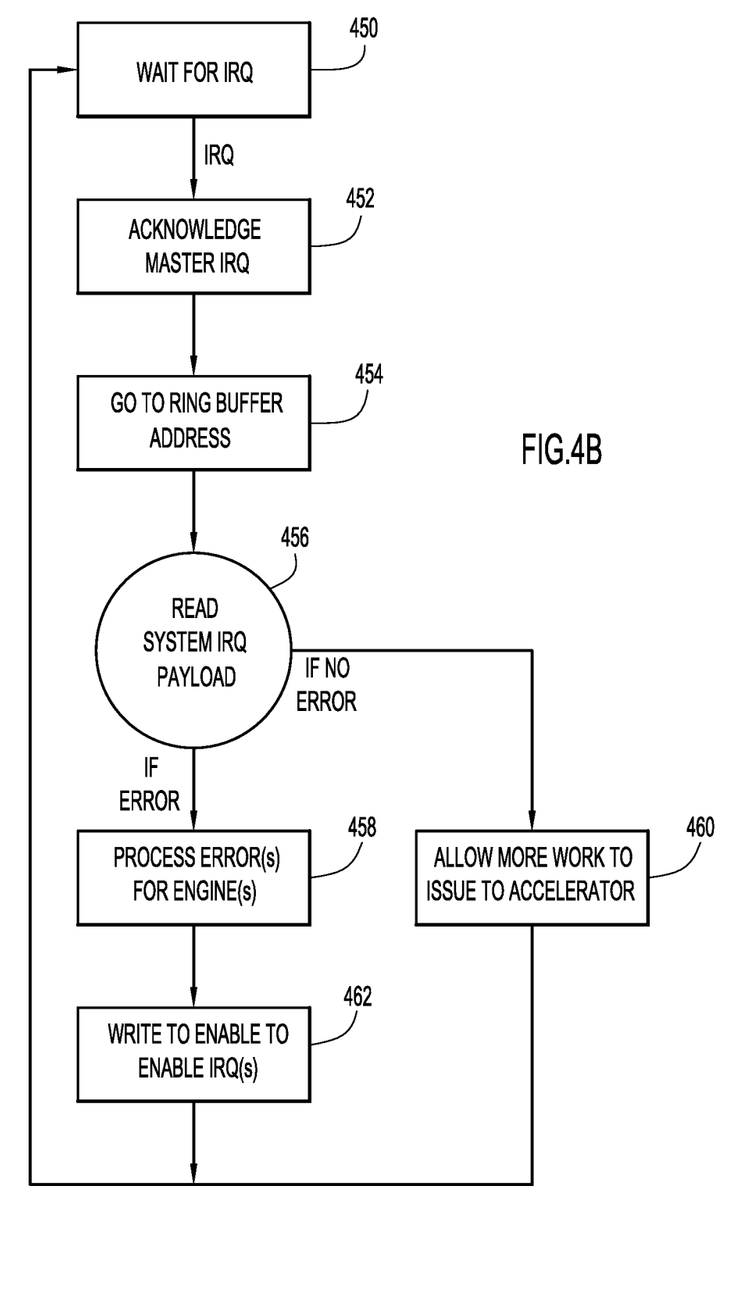
FIG. 4B is a procedural flowchart showing example operations of aspects of the ISR process controlled by the CPU in accordance with an embodiment of the present invention.

FIG. 4B shows an example flowchart of operations performed by the CPU according to present invention embodiments, regarding writing of interrupt data to a ring buffer, e.g., IRQ memory ring 32. At operation 450, the CPU waits for an IRQ signal. Once the IRQ signal is received, e.g., a master IRQ signal such as MSI 360, the CPU sends an acknowledgement regarding receipt of the master IRQ signal at operation 452. At operation 454, the CPU locates the address of the ring buffer, e.g., IRQ memory ring 32. At operation 456, the CPU reads the system IRQ payload, e.g., chip level ISR information and/or ISR information 340(0)-ISR information 340(N) corresponding to each core engine, stored in the ring buffer. In some embodiments, the ring buffer may be any size, in 4 kB allocations, and may contain as many entries as necessary. Examples of information stored in the ring buffer are provided in Tables 1 and 2.

If no errors are present in the IRQ payload, at operation 460, more work may be sent to the hardware accelerator. If errors are present, at operation 458, the errors are processed by IRQ handler 52. At operation 462, IRQs are enabled by writing to enable.

Figure 4C:
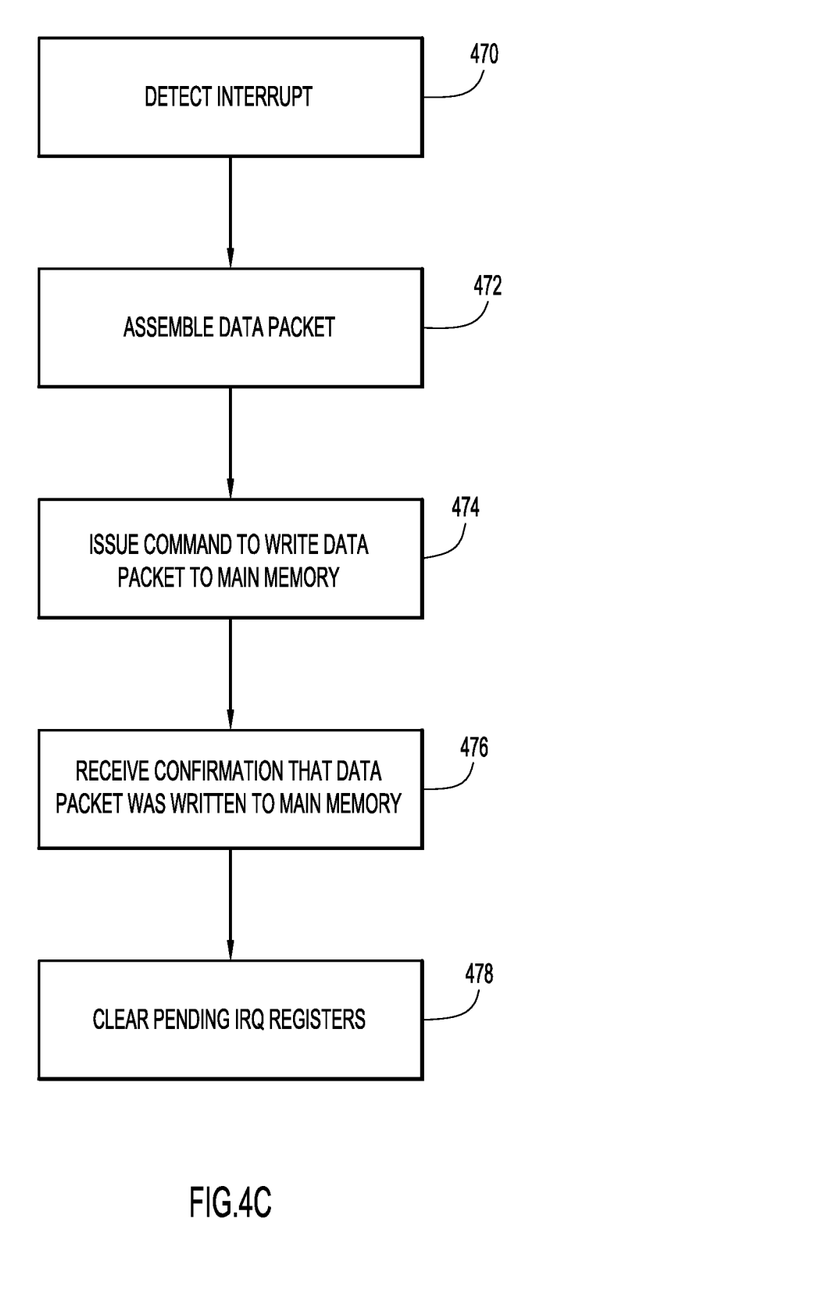
FIG. 4C is a procedural flowchart showing example operations of aspects of the ISR process controlled by the hardware accelerator in accordance with an embodiment of the present invention.

FIG. 4C shows an example flowchart of operations performed by the hardware accelerator 20. According to present invention embodiments, a portion of ISR software is moved into the hardware accelerator, and provided with dedicated logic, to write information associated with ISRs of the hardware accelerator into main memory. At operation 470, an interrupt (ISR) is detected by interrupt request hardware aggregation module 23. At operation 472, a data packet (e.g., FIGS. 5A-5B) comprising the aggregate status of each core engine is generated, by interrupt request hardware aggregation module 23. At operation 474, DMAC module 24 writes all or a portion of the data packet to main memory 30. In some embodiments, the interrupt signal triggers DMAC 24 to write the data structure into the memory ring in CPU memory (e.g., main memory). At operation 476, hardware accelerator 20 receives confirmation that the data packet was successfully written to main memory 30. At operation 478, pending IRQ registers are cleared.

Accordingly, moving a portion of the ISR software into the hardware accelerator allows the status of the entire accelerator to be provided to the CPU using a single DMAC exchange, greatly decreasing idle time for the core engines. A single acknowledgement of receiving the data packet, the data packet comprising aggregate ISR information for each interrupt associated with each core engine and/or of the entire state of the chip, may be sent instead of retrieving such information using multiple MMIO requests.

Figure 5A:
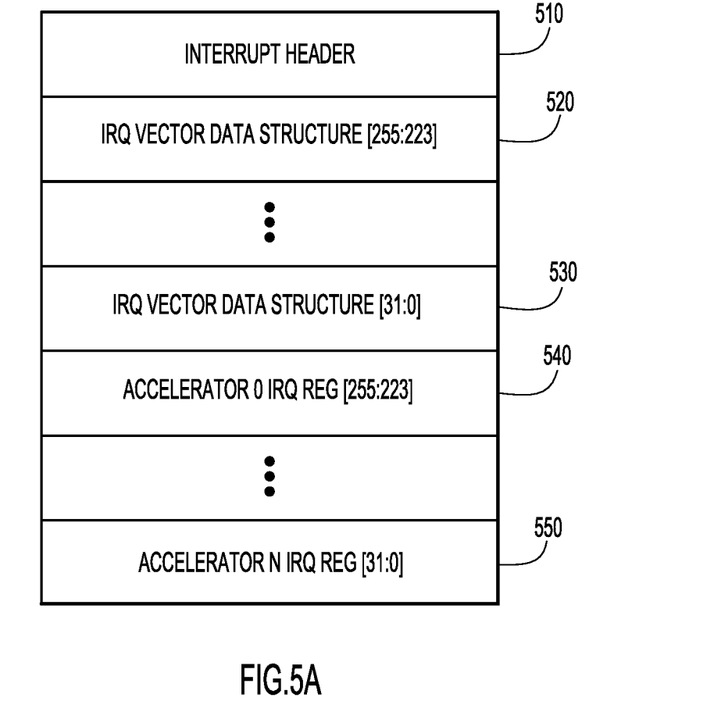
FIG. 5A is an example of a packet generated by the accelerator in accordance with an embodiment of the present invention.
Figure 5B:
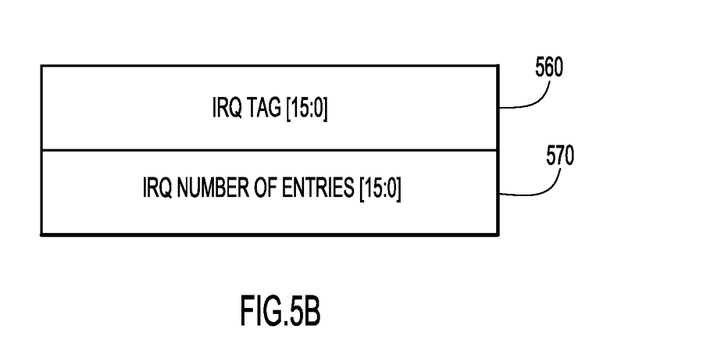
FIG. 5B is an example of a header for the packet of FIG. 5A generated by the accelerator in accordance with an embodiment of the present invention.

FIGS. 5A-5B show an example packet sent from hardware accelerator 20 to main memory 30. The information within the packet may be written to main memory, allowing the CPU to quickly access information associated with interrupts for each core engine.

Block 510 of the packet includes an interrupt header, which precedes the packet body and contains information needed for the packet to reach its intended destination. The packet header includes an IRQ tag or identifier 560 and the number of entries in the packet 570 (FIG. 5B). Blocks 520 and 530 include a system IRQ Vector data structure [255:0] (e.g., Table 1) which include information for each core engine of the hardware accelerator. Blocks 540 through 550 include an IRQ Reg [255:0] for each core engine (e.g., Table 2; with the blocks extending from the initial bits [31:0] for core engine N through the final bits [255:223] for core engine 0).

Providing interrupt information as a single packet reduces the amount of traffic over the PCIe bus. Instead of sending information associated with the interrupt status of the system and each core engine separately, which requires multiple MMIO reads and acknowledgements, which take more time than a DMA packet, the status of all core engines may be sent in a single packet.

Figure 6A:
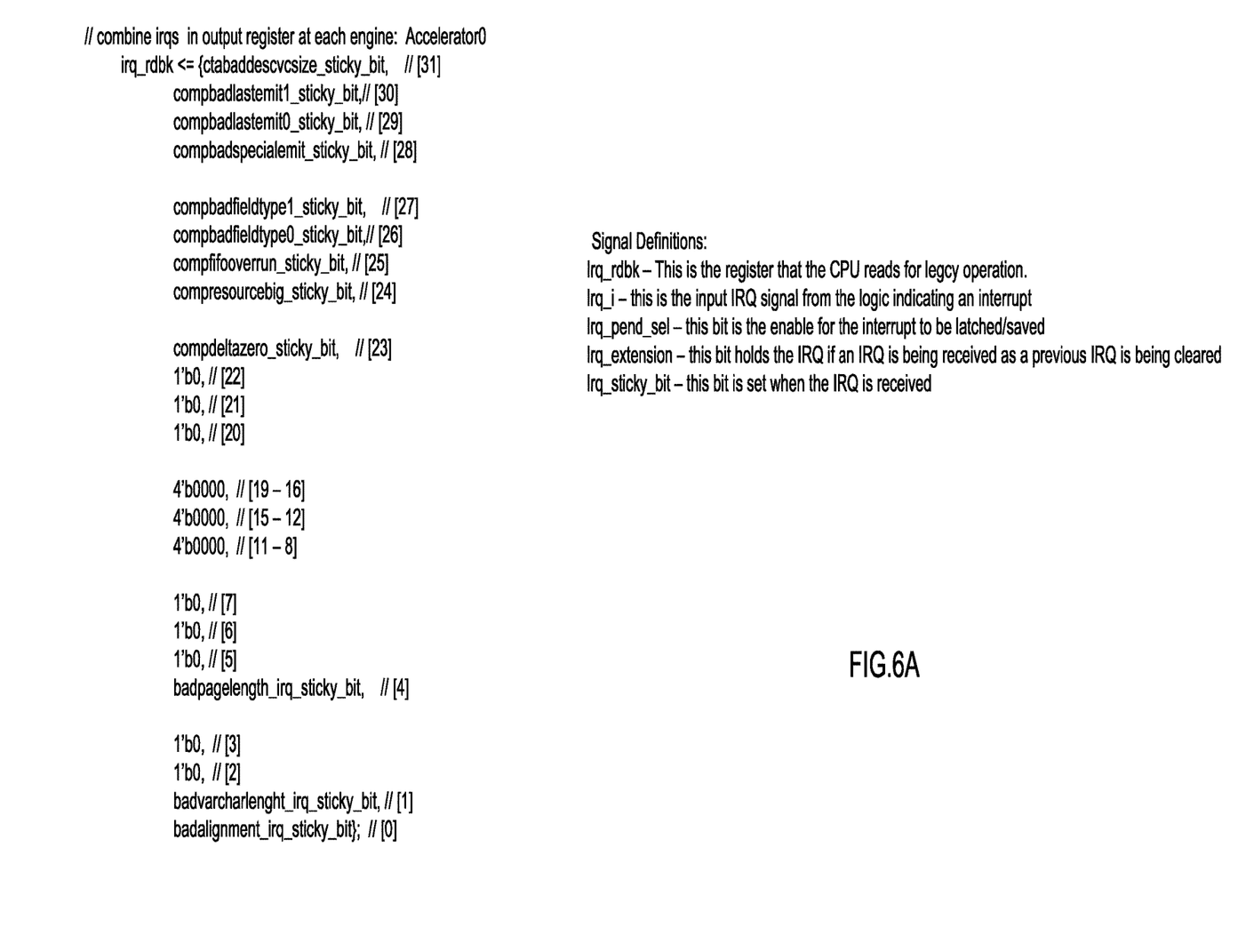
FIGS. 6A-B are examples of hardware description language source code for managing ISRs in accordance with an embodiment of the present invention.

FIG. 6A shows example code in a hardware programming language for interrupt operations, e.g., Verilog, for holding the interrupt during a clear command. FIG. 6A shows IRQs being combined in an output register (at each engine) to generate an 'irq_rdbk' signal, which is the register that the CPU reads for legacy operation. The 'done' IRQ signal is delayed until the status is out.

Figure 6B:
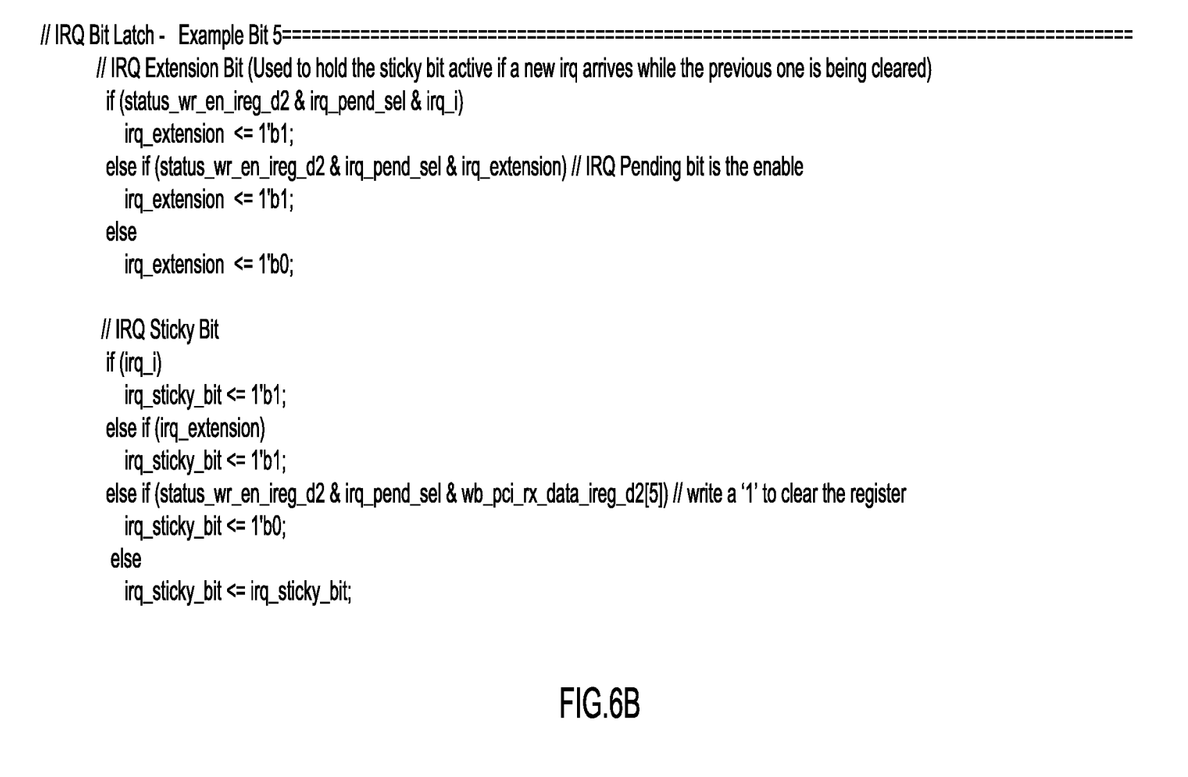

FIG. 6B shows logic corresponding to triggering of interrupts. An IRQ extension bit is set high when a new IRQ signal arrives while the previous IRQ signal is cleared. An IRQ sticky bit is set high when an IRQ signal is received. Other signal include, 'irq_i', which is the input IRQ signal from the logic indicating an interrupt, and 'irq_pend_sel', which is the enable bit enable for the interrupt to be latched/saved.

In summary, in an embodiment of the present invention, one or more IRQ signals are generated from one or more core engines of a hardware accelerator. The IRQ signals are aggregated, and combined with chip level IRQ signals into a single packet. The packet is written to main memory (memory that is associated with a CPU). Upon receiving a communication from the hardware accelerator, indicating that the packet has been written to main memory, the CPU sends an acknowledgement to the hardware accelerator. The hardware accelerator clears IRQ status information corresponding to the information sent in the packet. The CPU evaluates the IRQ information, and initiates appropriate subroutines in response to the provided IRQ information.

Accordingly, present invention embodiments reduce CPU load for responding to numerous interrupts and reduce idle time of the accelerators. MMIO traffic across the PCIe bus is minimized, reducing idle time in between accelerator runs. Additionally, because the accelerator driver targets specific registers in the accelerator for initializing the buffer rings, simplified Single-Root Input/Output Virtualization (SR-IOV) implementations and management are provided for. The single ISR then has the ability to process all IRQs without any unnecessary MMIO responses allowing for faster processing and lower CPU overhead.

Present invention embodiments also allow for better management of multitenancy accelerators as a single ISR can vector to various functions to process different, parallel accelerators without disturbing the accelerator environment with probes to determine which tenant needs assistance. The single accelerator complex can more easily manage multiple virtual functions more effectively as intelligent hardware takes on more of the burden for communication.

It will be appreciated that the embodiments described above and illustrated in the drawings represent only a few of the many ways of implementing embodiments for processing of events for accelerators utilized for parallel processing.

It is to be understood that the software (e.g., accelerator driver 50, application software 38, operating system 36, etc.) of present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., accelerator driver 50, application software 38, operating system 36, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The present invention embodiments may employ any number of any type of user interface (e.g., Graphical User Interface (GUI), command-line, prompt, etc.) for obtaining or providing information (e.g., information associated with IRQs, information associated with ISRs, etc.), where the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

Reports may be generated and may include any information arranged in any fashion, and may be configurable based on rules or other criteria to provide desired information to a user (e.g., address information, interrupt information, data to be processed, etc.).

The present invention embodiments are not limited to the specific tasks or algorithms described above, but may be utilized for managing interrupt signals in parallel processing in general, or any parallel process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for managing interrupt signals at a peripheral device comprising:
    detecting, at the peripheral device, that an interrupt request has been generated at a plurality of core engines of the peripheral device;
    storing in one or more registers of a peripheral device memory for each of the plurality of core engines information associated with the interrupt request;
    aggregating, at the peripheral device, the information associated with the interrupt request for each of the plurality of core engines into a vector of registers in the peripheral device memory;
    writing the aggregated information from the peripheral device to memory of a Central Processing Unit (CPU) of a host machine to enable CPU processing of interrupt requests from each of the plurality of core engines of the peripheral device from the memory of the CPU; and
    clearing each register of the peripheral device memory associated with the aggregated information in response to receiving an acknowledgement from the CPU that the aggregated information was written to the memory of the CPU.

2. The computer-implemented method of claim 1, further comprising:
    generating an instruction by a controller to write the aggregated information directly to the memory of the CPU.

3. The computer-implemented method of claim 2, wherein the aggregated information from each core engine is combined with system level interrupt information of the peripheral device, and is encapsulated into one or more packets that are provided to the host machine, wherein the aggregated information from each core engine and the system level interrupt information is to be directly written to the memory of the CPU.

4. The computer-implemented method of claim 1, wherein writing the aggregated information to memory of the CPU further comprises writing the aggregated information to a memory ring of the CPU.

5. The computer-implemented method of claim 1, wherein the aggregated information further comprises one or more error flags generated by a core engine of the peripheral device.

6. The computer-implemented method of claim 1, further comprising:
   sending a command to the host machine indicating that the aggregated information has been written to the memory of the CPU, wherein the command is used by the CPU for initiating processing of the interrupt requests.

7. A system for managing interrupt signals at a peripheral device comprising:
   at least one processor configured to:
      detect, at the peripheral device, that an interrupt request has been generated at a plurality of core engines of the peripheral device;
      store in one or more registers of a peripheral device memory for each of the plurality of core engines information associated with the interrupt request;
      aggregate, at the peripheral device, the information associated with the interrupt request for each of the plurality of core engines into a vector of registers in the peripheral device memory;
      write the aggregated information from the peripheral device to memory of a Central Processing Unit (CPU) of a host machine to enable CPU processing of interrupt requests from each of the plurality of core engines of the peripheral device from the memory of the CPU; and
      clear each register of the peripheral device memory associated with the aggregated information in response to receiving an acknowledgement from the CPU that the aggregated information was written to the memory of the CPU.

8. The system of claim 7, wherein the at least one processor is configured to:
   generate an instruction by a controller to write the aggregated information directly to the memory of the CPU.

9. The system of claim 8, wherein the aggregated information from each core engine is combined with system level interrupt information of the peripheral device, and is encapsulated into one or more packets that are provided to the host machine, wherein the aggregated information from each core engine and the system level interrupt information is to be directly written to the memory of the CPU.

10. The system of claim 7, wherein the at least one processor is configured to:
    write the aggregated information to a memory ring of the CPU.

11. The system of claim 7, wherein the aggregated information further comprises one or more error flags generated by a core engine of the peripheral device.

12. The system of claim 7, wherein the at least one processor is configured to:
    send a command to the host machine indicating that the aggregated information has been written to the memory of the CPU, wherein the command is used by the CPU for initiating processing of the interrupt requests.

13. A computer-implemented method for managing interrupt signals at a host device comprising:
    receiving, at the host device from a peripheral device, aggregated information associated with interrupt requests at the peripheral device for each of a plurality of core engines of the peripheral device, wherein the peripheral device aggregates information associated with the interrupt request for each of the plurality of core engines into a vector of registers in peripheral device memory;
    allowing the aggregated information to be written from the peripheral device to memory of a Central Processing Unit (CPU) of the host device to enable CPU processing of the interrupt requests from each of the plurality of core engines of the peripheral device from the memory of the CPU; and
    sending an acknowledgement to the peripheral device from the CPU that the aggregated information was written to the memory of the CPU to clear each register of the peripheral device memory associated with the aggregated information.

14. The computer-implemented method of claim 13, further comprising:
    receiving an instruction from a controller, the instruction indicating that the peripheral device requests access to write the aggregated information directly to the memory of the CPU.

15. The computer-implemented method of claim 14, wherein the aggregated information from each core engine is combined with system level interrupt information of the peripheral device, and is encapsulated into one or more packets that are provided to the host device, wherein the aggregated information from each core engine and the system level interrupt information is to be directly written to the memory of the CPU.

16. The computer-implemented method of claim 13, wherein the aggregated information is written to a memory ring of the CPU.

17. The computer-implemented method of claim 13, wherein the aggregated information further comprises one or more error flags generated by a core engine of the peripheral device.

18. The computer-implemented method of claim 13, further comprising:
    receiving a command from the peripheral device indicating that the aggregated information has been written to the memory of the CPU; and
    reading the aggregated information and processing the associated interrupt requests.

* * * * *